United States Patent
Lee

(10) Patent No.: US 8,787,125 B1
(45) Date of Patent: Jul. 22, 2014

(54) DISK DRIVE CALIBRATING FLY HEIGHT ACTUATOR TO ENABLE LASER BIASING DURING NON-WRITE MODE

(71) Applicant: Western Digital Technologies, Inc., Irvine, CA (US)

(72) Inventor: Tehri S. Lee, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/802,583

(22) Filed: Mar. 13, 2013

(51) Int. Cl.
*G11B 11/00* (2006.01)

(52) U.S. Cl.
USPC .................................................. 369/13.26

(58) Field of Classification Search
USPC .......... 369/13.02, 13.13, 13.24, 13.26, 13.33; 360/59, 75
See application file for complete search history.

(56) References Cited

U.S. PATENT DOCUMENTS

| | | | |
|---|---|---|---|
| 5,392,273 A | 2/1995 | Masaki et al. |
| 5,805,559 A | 9/1998 | Murakami et al. |
| 6,046,970 A | 4/2000 | DeCusatis et al. |
| 6,359,433 B1 | 3/2002 | Gillis et al. |
| 6,417,981 B1 | 7/2002 | Smith |
| 6,636,460 B2 | 10/2003 | Akiyama et al. |
| 6,700,724 B2 | 3/2004 | Knippenberg et al. |
| 6,771,440 B2 | 8/2004 | Smith |
| 6,801,376 B2 | 10/2004 | Smith |
| 6,804,189 B2 | 10/2004 | Inase et al. |
| 6,883,368 B2 | 4/2005 | Smith et al. |
| 6,894,854 B1 | 5/2005 | Carlson et al. |
| 6,950,260 B2 | 9/2005 | Coffey et al. |
| 6,975,472 B2 | 12/2005 | Stover et al. |
| 7,023,647 B2 | 4/2006 | Bloodworth et al. |
| 7,068,449 B2 | 6/2006 | Riddering et al. |
| 7,095,577 B1 | 8/2006 | Codilian et al. |
| 7,099,097 B2 | 8/2006 | Hamaguchi et al. |
| 7,161,882 B2 | 1/2007 | Lehr et al. |
| 7,177,253 B2 | 2/2007 | Ishibashi et al. |
| 7,180,692 B1 | 2/2007 | Che et al. |
| 7,324,299 B1 | 1/2008 | Schreck et al. |
| 7,369,340 B1 | 5/2008 | Dang et al. |
| 7,400,473 B1 | 7/2008 | Krajnovich et al. |
| 7,412,143 B2 | 8/2008 | Rottmayer et al. |
| 7,436,620 B1 | 10/2008 | Kang et al. |

(Continued)

OTHER PUBLICATIONS

Lawrence A. Johnson, "Accelerated Aging Test of 1310 nm Laser Diodes", ILX Lightwave Application Note #29, May 31, 2006, http://www.ilxlightwave.com/appnotes/AN%2029%20REV01%20Accelerated%20Aging%20Test%20of%201310nm%20LD.pdf.

(Continued)

*Primary Examiner* — Brenda Bernardi

(57) ABSTRACT

A disk drive is disclosed comprising a disk, a head comprising a laser operable to heat the disk while writing data to the disk, and a fly height actuator (FHA) operable to actuate the head vertically over the disk. A setting is applied to the FHA to maintain a fly height of the head. An approximately zero bias laser power is applied to the laser during a non-write mode, and a first write laser power is calibrated during a write mode. A non-zero bias laser power is applied to the laser during the non-write mode, and a second write laser power is calibrated during the write mode. When the second write laser power is different than the first write laser power, the setting of the FHA is adjusted to adjust the fly height of the head.

26 Claims, 4 Drawing Sheets

(56) References Cited

U.S. PATENT DOCUMENTS

| | | |
|---|---|---|
| 7,440,219 B2 | 10/2008 | Zhu et al. |
| 7,489,466 B2 | 2/2009 | Knigge et al. |
| 7,502,205 B1 | 3/2009 | Hurtado et al. |
| 7,508,617 B1 | 3/2009 | Mak et al. |
| 7,675,707 B1 | 3/2010 | Liu et al. |
| 7,724,470 B2 | 5/2010 | Poon et al. |
| 7,791,986 B2 | 9/2010 | Koyama et al. |
| 7,839,595 B1 | 11/2010 | Chue et al. |
| 7,876,655 B2 | 1/2011 | Sasaki |
| 7,898,759 B2 | 3/2011 | Matsumoto et al. |
| 7,916,420 B1 | 3/2011 | McFadyen et al. |
| 7,990,647 B2 | 8/2011 | Lille |
| 7,995,425 B2 | 8/2011 | Schreck et al. |
| 8,059,357 B1 | 11/2011 | Knigge et al. |
| 8,248,732 B2 | 8/2012 | Nishiyama et al. |
| 8,248,896 B1 | 8/2012 | Yuan et al. |
| 8,300,338 B1 | 10/2012 | McFadyen |
| 8,320,069 B1 | 11/2012 | Knigge et al. |
| 8,441,909 B1 | 5/2013 | Thayamballi et al. |
| 8,456,980 B1 | 6/2013 | Thayamballi |
| 8,619,508 B1 | 12/2013 | Krichevsky et al. |
| 2002/0136115 A1 | 9/2002 | Kadlec et al. |
| 2006/0233061 A1 | 10/2006 | Rausch et al. |
| 2007/0014041 A1 | 1/2007 | Lille et al. |
| 2007/0230012 A1 | 10/2007 | Erden et al. |
| 2007/0291401 A1 | 12/2007 | Sun et al. |
| 2008/0158730 A1 | 7/2008 | Furukawa et al. |
| 2009/0207519 A1 | 8/2009 | Erden et al. |
| 2009/0225464 A1 | 9/2009 | Juang et al. |
| 2009/0251828 A1 | 10/2009 | Schreck et al. |
| 2009/0303629 A1 | 12/2009 | Nakano et al. |
| 2010/0123967 A1 | 5/2010 | Batra et al. |
| 2010/0232050 A1 | 9/2010 | Schreck et al. |
| 2011/0090602 A1 | 4/2011 | Nishiyama et al. |
| 2011/0205861 A1 | 8/2011 | Erden et al. |
| 2011/0292773 A1 | 12/2011 | Schreck et al. |
| 2012/0188859 A1 | 7/2012 | Hara et al. |
| 2013/0077453 A1* | 3/2013 | Alex .................... 369/13.26 |

OTHER PUBLICATIONS

Patrick Gale, "Estimating Laser Diode Lifetimes and Activation Energy", ILX Lightwave Application Note 33, 2008, http://www.ilxlightwave.com/appnotes/AN%2033%20REV01%20Estimating%20Laser%20Diode%20Lifetimes%20&%20Activation%20Energy.pdf.

\* cited by examiner

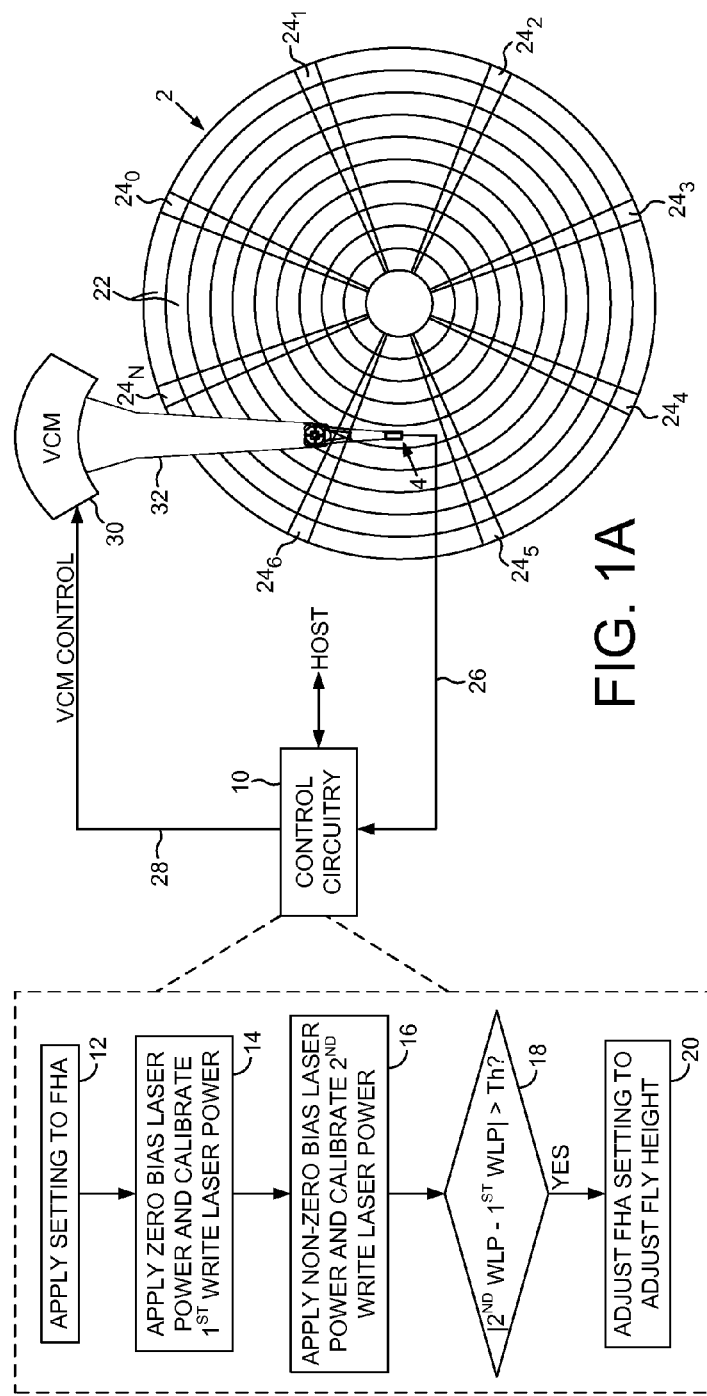
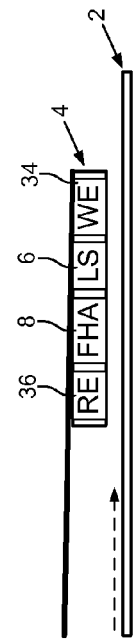

DISK DRIVE CALIBRATING FLY HEIGHT ACTUATOR TO ENABLE LASER BIASING DURING NON-WRITE MODE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Data is typically written to the disk by modulating a write current in an inductive coil to record magnetic transitions onto the disk surface in a process referred to as saturation recording. During readback, the magnetic transitions are sensed by a read element (e.g., a magnetoresistive element) and the resulting read signal demodulated by a suitable read channel. Heat assisted magnetic recording (HAMR) is a recent development that improves the quality of written data by heating the disk surface with a laser during write operations in order to decrease the coercivity of the magnetic medium, thereby enabling the magnetic field generated by the write coil to more readily magnetize the disk surface.

BRIEF DESCRIPTION OF THE DRAWINGS

FIG. 1A shows a disk drive according to an embodiment comprising a head actuated over a disk.

FIG. 1B shows a head according to an embodiment comprising a write element, a read element, a laser operable to heat the disk while writing data to the disk, and a fly height actuator (FHA) operable to actuate the head vertically over the disk.

FIG. 1C shows a flow diagram according to an embodiment wherein a first laser power is calibrated with a zero bias laser power during a non-write mode, and then a second laser power is calibrated with a non-zero bias laser power during the non-write mode.

DETAILED DESCRIPTION

Figure 2A:
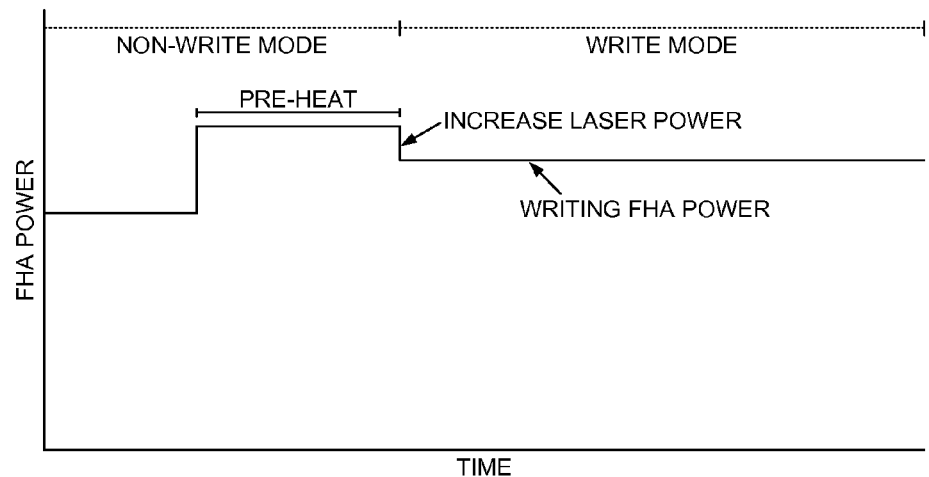
FIG. 2A shows a waveform representing the FHA power during a non-write mode and a write mode according to an embodiment.

FIG. 1A shows a disk drive according to an embodiment comprising a disk 2, and a head 4 (FIG. 1B) comprising a laser 6 operable to heat the disk 2 while writing data to the disk 2. The disk drive further comprises a fly height actuator (FHA) 8 operable to actuate the head 4 vertically over the disk 2, and control circuitry 10 operable to execute the flow diagram of FIG. 1C. A setting is applied to the FHA to maintain a fly height of the head (block 12), an approximately zero bias laser power is applied to the laser during a non-write mode, and a first write laser power is calibrated during a write mode (block 14). A non-zero bias laser power is applied to the laser during the non-write mode and a second write laser power is calibrated during the write mode (block 16). When the second write laser power is different than the first write laser power (block 18), the setting of the FHA is adjusted to adjust the fly height of the head (bock 20).

In the embodiment of FIG. 1A, the disk 2 comprises a plurality of servo tracks 22 defined by servo sectors $24_0$-$24_N$, wherein data tracks are defined relative to the servo tracks at the same or different radial density. The control circuitry 10 processes a read signal 26 emanating from the head 4 to demodulate the servo sectors $24_0$-$24_N$ and generate a position error signal (PES) representing an error between the actual position of the head and a target position relative to a target track. The control circuitry 10 filters the PES using a suitable compensation filter to generate a control signal 28 applied to a voice coil motor (VCM) 30 which rotates an actuator arm 32 about a pivot in order to actuate the head 4 radially over the disk 2 in a direction that reduces the PES. The servo sectors $24_0$-$24_N$ may comprise any suitable head position information, such as a track address for coarse positioning and servo bursts for fine positioning. The servo bursts may comprise any suitable pattern, such as an amplitude based servo pattern or a phase based servo pattern.

In the embodiment of FIG. 1B, the head 4 comprises a suitable write element 34, such as an inductive coil, and a suitable read element 36, such as a magnetoresistive element. The head 4 may comprise any suitable laser 6 for heating the disk 2, such as a laser diode, as well as any suitable optics for focusing the light emitted by the laser 6 onto the disk, such as a waveguide and a near field transducer (NFT). In addition, any suitable FHA 8 may be employed, such as a heater that actuates through thermal expansion, or a piezoelectric actuator that actuates through mechanical deflection.

In an embodiment described below, a setting (e.g., current) applied to the FHA 8 is calibrated in order to achieve a target fly height for the head 4. In one embodiment, the setting is calibrated by performing a touchdown procedure wherein the setting is increased until the head touching down onto the disk surface is detected. An operating setting is then selected by backing off from the touchdown setting by a predetermined offset. In one embodiment illustrated in FIG. 2A, while the head 4 is not used to access the disk (e.g., during a write operation), the FHA 8 may be adjusted to increase the fly height in order to protect the head 4 from colliding with thermal asperities on the disk surface. When the head 4 nears the target data sector of a write operation, the FHA power is increased during a pre-heat interval, thereby compensating for the thermal expansion delay of the FHA 8. When the head 4 reaches the target data sector, the control circuitry transitions from a non-write mode to a write mode wherein a write laser power is applied to the laser 6, and the FHA power is decreased by a step decrement to account for the heating effect of the write coil. That is, the heating effect of the write coil will cause the head 4 to protrude toward the disk surface, and therefore the FHA power is decreased by a corresponding decrement. In other embodiments, the waveform representing the FHA power may comprise a different AC pattern, such as a waveform without a pre-heat interval, or a waveform comprising a pulse decrement prior to applying the full write laser power to compensate for a protrusion transient of the NFT at the beginning of the write mode.

In one embodiment, there is a delay associated with applying the write laser power and the laser 6 turning on (e.g., a turn-on time constant). In addition, the light emitted by the laser 6 will heat the NFT and cause it to protrude toward the disk surface due to thermal expansion, and therefore there is a protrusion delay for the NFT (e.g., a protrusion time constant). These delays may reduce the quality of the written data at the beginning of a write operation, with a corresponding reduction in the quality of the read signal during a read operation. In one embodiment, the turn-on and protrusion delays associated with the laser 6 are reduced by applying a non-zero bias laser power to the laser 6 during a non-write mode. The non-zero bias laser power decreases the turn-on time of the laser 6 and pre-heats the NFT which decreases the protrusion delay when the write laser power is applied at the beginning of a write operation. However, the non-zero bias laser power applied to the laser 6 will decrease the non-write mode fly height of the head 4 by an unknown amount. Since the NFT protrusion is typically very small relative to the head 4, the conventional touchdown procedure used to calibrate the FHA setting to achieve a target fly height will typically provide an inaccurate (undercompensated) result, thereby resulting in damage to the head 4 during write operations due to head/disk contact.

Figure 2B:
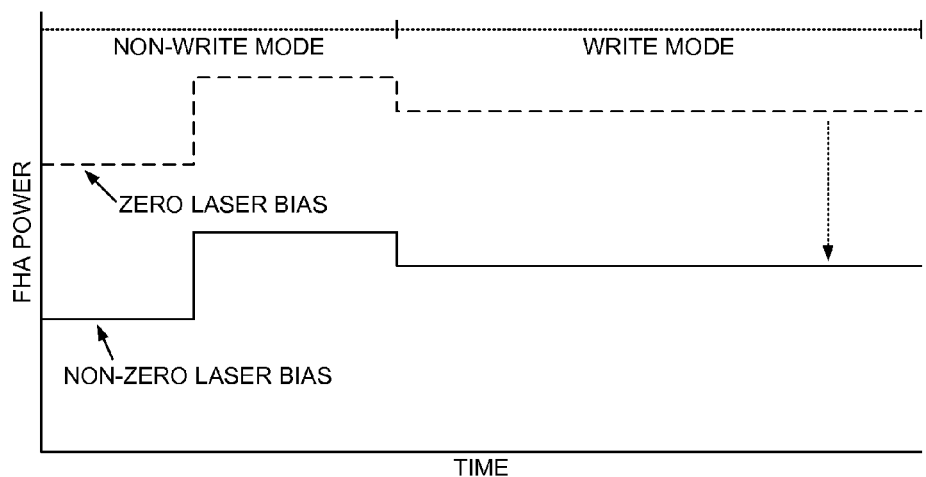
FIG. 2B shows an embodiment wherein the waveform representing the FHA power is reduced by an offset which compensates for a non-zero bias laser power during the non-write mode.

Accordingly, in one embodiment a different calibration procedure is employed to calibrate the FHA setting that achieves a target fly height while accurately compensating for the NFT protrusion due to a non-zero bias laser power applied to the laser 6 during non-write modes. In one embodiment, the result of recalibrating the FHA to account for a non-zero bias laser power is that the waveform for the FHA power shown in FIG. 2A is reduced by a DC offset as shown in FIG. 2B. In one embodiment, the DC offset shown in FIG. 2B is calibrated by finding the FHA setting that achieves the same calibrated write laser power after enabling the non-zero bias laser power during the non-write mode.

Figure 3:
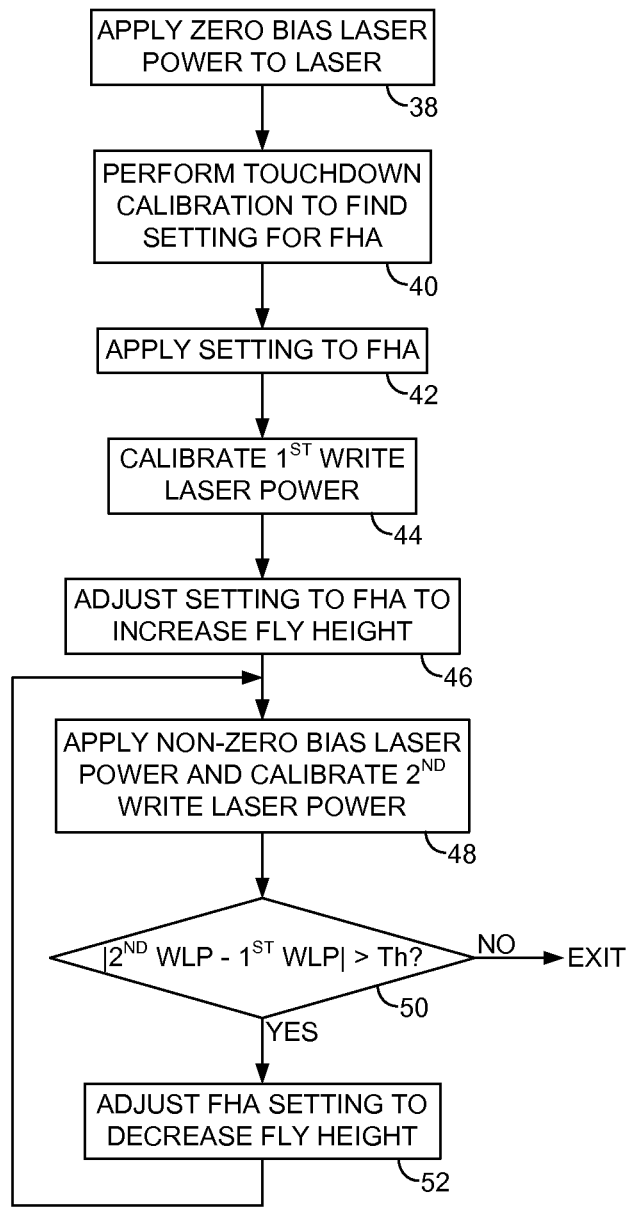
FIG. 3 is a flow diagram according to an embodiment wherein an initial FHA power is calibrated based on a touchdown procedure, the laser power is calibrated for a write mode with a zero bias laser power during a non-write mode, and then the FHA power is recalibrated with a non-zero bias laser power during the non-write mode.

This embodiment is understood with reference to the flow diagram of FIG. 3 wherein after applying a zero bias laser power (block 38), a touchdown calibration is executed to find the FHA setting that achieves a target fly height (block 40). While applying this FHA setting to the FHA 8 (block 42), a first write laser power is calibrated that achieves a desired write quality (block 44). In one embodiment, the first write laser power is calibrated by adjusting the laser power during a write operation until a suitable quality metric of the read signal is achieved during a read operation. For example, the laser power may be adjusted until the amplitude of the read signal generated during the read operation reaches a target level, or until a noise power of the read signal reaches a target level, or until a bit error rate reaches a target level, etc. After calibrating the first write laser power at block 44, the FHA setting is adjusted in order to significantly increase the fly height (block 46). A non-zero bias laser power is than applied to the laser 6, and a second write laser power is calibrated that achieves the same quality metric as in block 44 (e.g., same read signal amplitude). If a difference between the first write laser power and the second write laser power exceeds a threshold (block 50), the FHA setting is adjusted in order to decrease the fly height (block 52). In this embodiment, the fly height is increased at block 46 to ensure the head 4 will be flying too high after applying the non-zero bias laser power during the non-write mode. Since the fly height will be too high, the second write laser power calibrated at block 48 will be higher than the first write laser power calibrated at block 44. Accordingly, the FHA setting is adjusted at block 52 to incrementally decrease the fly height of the head 4 until the second write laser power calibrated at block 48 substantially equals (within a threshold) the first write laser power calibrated at block 44. In this manner, the final FHA setting at block 52 will result in a fly height for the head 4 that substantially matches the fly height calibrated at block 40 (the target fly height).

Figure 4A:
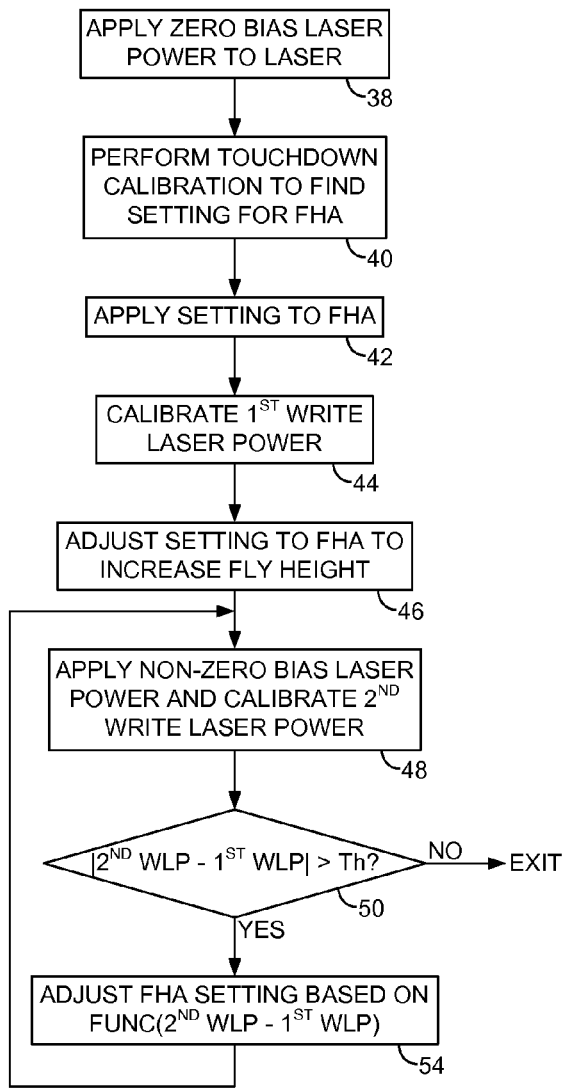
FIG. 4A is a flow diagram according to an embodiment wherein the FHA power is adjusted as a function of a difference between calibrated laser powers at different FHA settings.
Figure 4B:
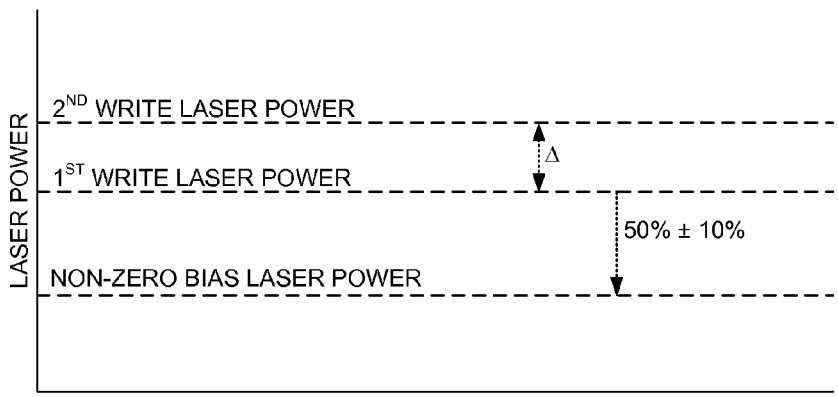
FIG. 4B shows an embodiment wherein the non-zero bias laser power applied during the non-write mode is approximately fifty percent of the write laser power.

FIG. 4A is a flow diagram according to an embodiment that is a variant to the flow diagram of FIG. 3, wherein the FHA setting is adjusted at block 54 based on a function of the delta between the first and second write laser powers. An example of this embodiment is illustrated in FIG. 4B wherein the non-zero bias laser power during the non-write mode is approximately fifty percent of the first write laser power (e.g., plus/minus ten percent), and the second write laser power calibrated at block 48 exceeds the first write laser power by a delta. Instead of adjusting the FHA setting to decrease the fly height by a step decrement, the FHA setting that should achieve the target fly height is estimated based on a function of the delta. In this manner, the FHA setting may converge faster to the setting that provides the desired write laser power and corresponding target fly height.

In one embodiment, the fly height may be increased at block 46 to a level that is too low rather than too high, but still high enough to avoid damaging the head during the write mode. In this embodiment, the FHA setting may be adjusted at block 52 of FIG. 3 to increase the fly height until the second write laser power substantially equals the first write laser power at block 50.

Any suitable non-write bias laser power may be employed, such as a setting that decreases the turn-on time of the laser 6 and protrusion delay of the NFT by any suitable percentage. For example, using a bias laser power that is approximately fifty percent of the write laser power as shown in FIG. 4B may achieve an approximately fifty percent reduction in the turn-on delay of the laser 6 and NFT protrusion delay. In other embodiments, a higher non-write bias laser power may be used during the non-write mode to further reduce the turn-on delay and protrusion delay as long as the heating effect during the non-write mode does not significantly reduce the coercivity of the disk (which could destabilize the data previously written to the disk). In yet another embodiment, a lower non-write bias laser power may be used in order to increase the life of the laser 6.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein.

What is claimed is:

1. A disk drive comprising:
    a disk;
    a head comprising a laser operable to heat the disk while writing data to the disk;
    a fly height actuator (FHA) operable to actuate the head vertically over the disk; and
    control circuitry operable to:
        apply a setting to the FHA to maintain a fly height of the head;
        apply a zero bias laser power to the laser during a non-write mode and calibrate a first write laser power during a write mode;
        apply a non-zero bias laser power to the laser during the non-write mode and calibrate a second write laser power during the write mode; and
        when the second write laser power is different than the first write laser power, adjust the setting of the FHA to adjust the fly height of the head.

2. The disk drive as recited in claim 1, wherein the control circuitry is further operable to adjust the setting of the FHA to adjust the fly height of the head until the second write laser power substantially matches the first write laser power.

3. The disk drive as recited in claim 1, wherein prior to applying the non-zero bias laser power to the laser, the control circuitry is further operable to adjust the setting to the FHA to increase the fly height of the head.

4. The disk drive as recited in claim 1, wherein the non-zero bias laser power reduces a turn-on time of the laser at a beginning of the write mode.

5. The disk drive as recited in claim 1, wherein the non-zero bias laser power causes the head to protrude toward the disk thereby reducing the fly height.

6. The disk drive as recited in claim 1, wherein the control circuitry is operable to calibrate the first and second laser powers based on a target quality metric.

7. The disk drive as recited in claim 1, wherein the control circuitry is operable to calibrate the first setting applied to the FHA by calibrating a touchdown setting applied to the FHA that causes the head to contact the disk.

8. The disk drive as recited in claim 1, wherein the setting of the FHA comprises a substantially constant value during at least part of the non-write mode.

9. The disk drive as recited in claim 8, wherein the control circuitry is further operable to adjust the setting of the FHA preceding the write mode to lower the fly height during a pre-heat interval.

10. The disk drive as recited in claim 8, wherein the control circuitry is further operable to adjust the setting of the FHA at a beginning of the write mode to compensate for a heating effect of the write laser power.

11. The disk drive as recited in claim 1, wherein when the second write laser power is different than the first write laser power, the control circuitry is operable to adjust the setting of the FHA to adjust the fly height of the head based on a difference between the second write laser power and the first write laser power.

12. The disk drive as recited in claim 1, wherein the non-zero bias laser power applied to the laser during the non-write mode does not significantly reduce a coercivity of the disk.

13. The disk drive as recited in claim 1, wherein the non-zero bias laser power applied to the laser during the non-write mode is approximately fifty percent of the first write laser power.

14. A method of operating a disk drive comprising a disk, a head comprising a laser operable to heat the disk while writing data to the disk, and a fly height actuator (FHA) operable to actuate the head vertically over the disk, the method comprising:
    applying a setting to the FHA to maintain a fly height of the head;
    applying zero bias laser power to the laser during a non-write mode and calibrate a first write laser power during a write mode;
    applying a non-zero bias laser power to the laser during the non-write mode and calibrate a second write laser power during the write mode; and
    when the second write laser power is different than the first write laser power, adjusting the setting of the FHA to adjust the fly height of the head.

15. The method as recited in claim 14, further comprising adjusting the setting of the FHA to adjust the fly height of the head until the second write laser power substantially matches the first write laser power.

16. The method as recited in claim 14, wherein prior to applying the non-zero bias laser power to the laser, further comprising adjusting the setting to the FHA to increase the fly height of the head.

17. The method as recited in claim 14, wherein the non-zero bias laser power reduces a turn-on time of the laser at a beginning of the write mode.

18. The method as recited in claim 14, wherein the non-zero bias laser power causes the head to protrude toward the disk thereby reducing the fly height.

19. The method as recited in claim 14, further comprising calibrating the first and second laser powers based on a target quality metric.

20. The method as recited in claim 14, further comprising calibrating the first setting applied to the FHA by calibrating a touchdown setting applied to the FHA that causes the head to contact the disk.

21. The method as recited in claim 14, wherein the setting of the FHA comprises a substantially constant value during at least part of the non-write mode.

22. The method as recited in claim 21, further comprising adjusting the setting of the FHA preceding the write mode to lower the fly height during a pre-heat interval.

23. The method as recited in claim 21, further comprising adjusting the setting of the FHA at a beginning of the write mode to compensate for a heating effect of the write laser power.

24. The method as recited in claim 14, wherein when the second write laser power is different than the first write laser power, further comprising adjusting the setting of the FHA to adjust the fly height of the head based on a difference between the second write laser power and the first write laser power.

25. The method as recited in claim 14, wherein the non-zero bias laser power applied to the laser during the non-write mode does not significantly reduce a coercivity of the disk.

26. The method as recited in claim 14, wherein the non-zero bias laser power applied to the laser during the non-write mode is approximately fifty percent of the first write laser power.

* * * * *